J. R. FLANNERY & E. I. DODDS.
STAY BOLT STRUCTURE.
APPLICATION FILED MAY 3, 1918.
1,295,882.
Patented Mar. 4, 1919.
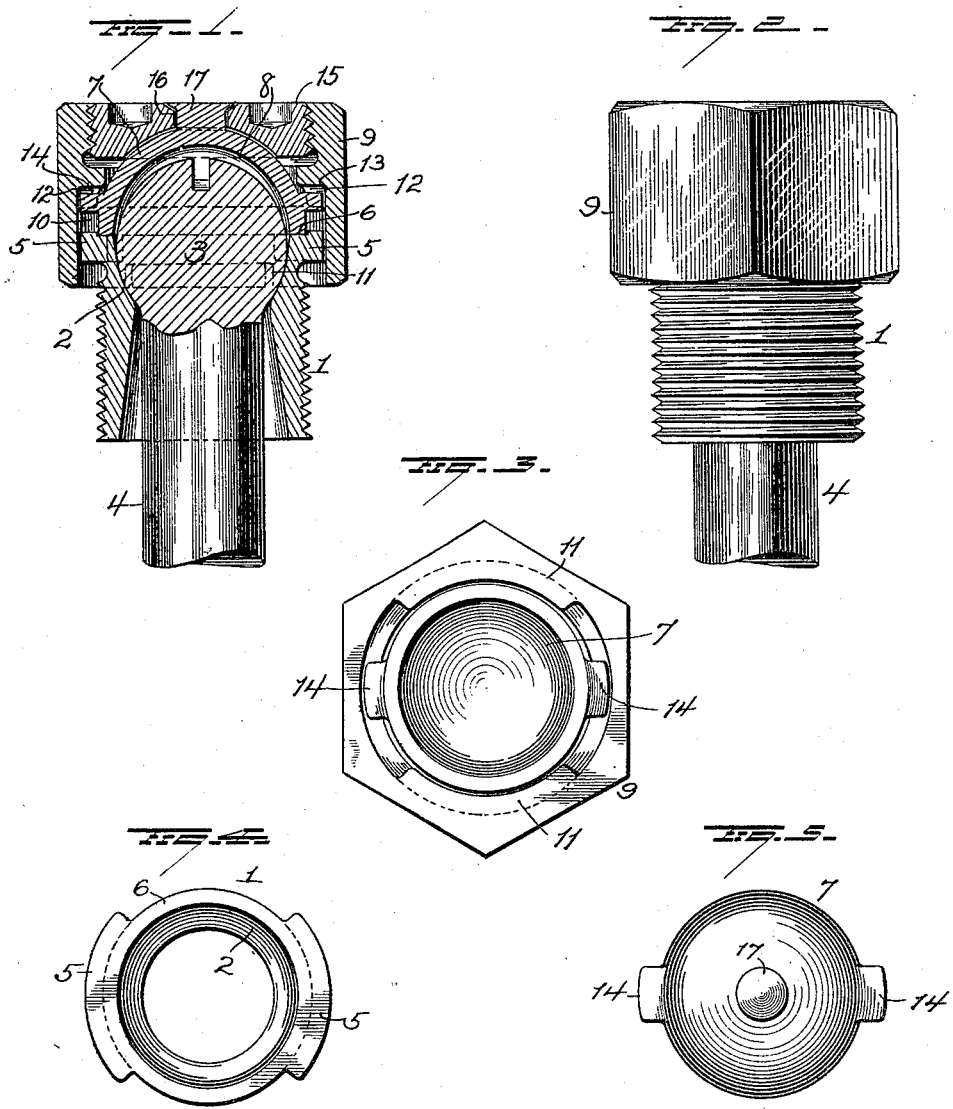

UNITED STATES PATENT OFFICE.

JOHN ROGERS FLANNERY AND ETHAN I. DODDS, OF PITTSBURGH, PENNSYLVANIA, ASSIGNORS TO FLANNERY BOLT COMPANY, OF PITTSBURGH, PENNSYLVANIA.

STAY-BOLT STRUCTURE.

1,295,882.  Specification of Letters Patent.  Patented Mar. 4, 1919.

Application filed May 3, 1918. Serial No. 232,302.

*To all whom it may concern:*

Be it known that we, JOHN ROGERS FLANNERY and ETHAN I. DODDS, citizens of the United States, and residents of Pittsburgh, in the county of Allegheny and State of Pennsylvania, have invented certain new and useful Improvements in Stay-Bolt Structures; and we do hereby declare the following to be a full, clear, and exact description of the invention, such as will enable others skilled in the art to which it appertains to make and use the same.

This invention relates to improvements in staybolt structures for boilers, and more particularly to means for closing the outer end of the bearing sleeve—the object of the invention being to facilitate the quick removal of the bearing sleeve closure to permit access to the staybolt for testing purposes, and to so construct the closure devices that they may be held tightly clamped in place normally.

With this and other objects in view the invention consists in certain novel features of construction and combinations of parts as hereinafter set forth and pointed out in the claims.

In the accompanying drawings, Figure 1 is a longitudinal sectional view of a stay-bolt structure embodying our invention. Fig. 2 is a side elevation. Fig. 3 is a bottom plan view with the bearing sleeve removed, and Figs. 4 and 5 are detail views.

1 represents a bearing sleeve adapted for connection with a boiler sheet and provided interiorly with a curved face 2 which serves as a bearing for the head 3 of a staybolt 4.

The bearing sleeve is provided exteriorly at its outer end with segmental shoulders or flanges 5 and the end of the sleeve is made with a seat 6 for the edge of a partly spherical cap or closure 7—which latter has a concavity of such dimensions and configuration as to provide a suitable clearance space 8 for the head of the staybolt.

A locking sleeve or member 9 is adapted to encircle the outer end portion of the bearing sleeve and incloses the cap or closure 7. The inner wall of the sleeve or member 9 is made with an annular recess 10 forming an internal flange at the lower end of said sleeve or member, which flange is cut away to provide two segmental shoulders 11 adapted to engage behind the segmental shoulders or flanges 5 on the bearing sleeve.

The upper wall of the annular recess 10 in the sleeve or member 9 is grooved as at 12, whereby shoulders 13 are formed and the cap or closure 7 is provided with lateral lugs 14 to engage said shoulders 13 and constitute stop means for limiting the turning of the locking sleeve or member relatively to the cap or closure.

The outer end portion of the locking sleeve or member 9 is threaded interiorly to receive a nut or carrier 15 having a concave inner face to conform to the curvature of the cap or closure. The nut or carrier is provided centrally with a hole 16 through which a nipple 17 on the cap passes loosely, the free end of said nipple being upset, and thus the cap is loosely connected with the nut or carrier and is capable of limited movement relatively thereto.

The locking member 9 with the cap and its carrier assembled therein, is placed on the bearing sleeve and then turned so as to cause the segmental shoulders 11 to become disposed behind the segmental shoulders 5 of the bearing sleeve. Such turning may be continued until the stop shoulders 13 within the sleeve 9 engage the stop lugs 14 on the cap. The nut or carrier 15 will then be screwed down in a manner to force the cap or closure tightly against its seat. The parts will then be securely locked to the bearing sleeve and the cap or closure held firmly against the end of the same. It is apparent that by a reversal of the above operation, the locking member 9 and the cap or closure 7 will be released from the bearing sleeve and may be quickly removed therefrom to expose the head of the staybolt for testing purposes. It is also clear that the closure devices may be as quickly replaced and firmly locked in position on the bearing sleeve.

Having fully described our invention what we claim as new and desire to secure by Letters-Patent, is:

1. In a staybolt structure, the combination with a bearing sleeve provided with segmental shoulders, and a cap or closure to seat against said bearing sleeve and provided with lateral stop lugs, of an annular locking member provided with segmental shoulders to engage behind the segmental shoulders of the bearing sleeve, said annular locking member having stop shoulders therein to coöperate with the stop lugs on the cap or closure, and a threaded member entering the locking sleeve or member for pressing the cap or closure against its seat.

2. In a staybolt structure, the combination with a bearing sleeve and a cap or closure to seat thereagainst, of a locking member coöperable with the bearing sleeve and inclosing the cap or closure, and a nut threaded in the locking member to engage the cap or closure and force it against its seat.

3. In a staybolt structure, the combination with a bearing sleeve and a cap or closure seated thereagainst, of an annular locking member inclosing the cap or closure, said bearing sleeve and locking member provided with interlocking shoulders, and a nut threaded in said locking member and loosely connected with the cap or closure and constituting a carrier therefor.

In testimony whereof, we have signed this specification in the presence of two subscribing witnesses.

JOHN ROGERS FLANNERY.
ETHAN I. DODDS.

Witnesses:
S. G. NOTTINGHAM,
R. S. FERGUSON.

Copies of this patent may be obtained for five cents each, by addressing the "Commissioner of Patents, Washington, D. C."